United States Patent [19]
Kato

[11] Patent Number: 5,106,551
[45] Date of Patent: Apr. 21, 1992

[54] METHOD FOR MANUFACTURING CERAMIC PRODUCTS

[75] Inventor: Kiminari Kato, Nagoya, Japan
[73] Assignee: NGK Insulators Ltd., Nagoya, Japan
[21] Appl. No.: 572,208
[22] Filed: Aug. 24, 1990
[51] Int. Cl.⁵ .............................................. C04B 41/00
[52] U.S. Cl. .................................. 264/66; 264/65; 264/67
[58] Field of Search .......................... 264/65, 67, 66

[56] References Cited

U.S. PATENT DOCUMENTS

| | | | |
|---|---|---|---|
| 4,550,004 | 10/1985 | Mizuno et al. | 264/67 |
| 4,579,705 | 4/1986 | Matsuoka | 264/66 |
| 4,834,926 | 5/1989 | Iwasaki et al. | 264/67 |
| 4,940,843 | 7/1990 | Adachi et al. | 264/67 |

FOREIGN PATENT DOCUMENTS 60-11261  1/1985  Japan .

OTHER PUBLICATIONS

Reports of Science Lecture Meeting, Seiki Gakkai (Autumn Meeting, 1985), P173-174, "511 Working and Machining of Calcined Ceramics".

Primary Examiner—James Derrington
Attorney, Agent, or Firm—Armstrong, Nikaido, Marmelstein, Kubovcik & Murray

[57] ABSTRACT

After hydrostatic pressure is applied to a formed ceramic material, the hydrostatic-pressure-applied formed ceramic material is calcined in such a temperature that shrinkage after calcination is less than one per cent. The obtained calcined ceramics has an average pore size of 0.04–0.3 μm and a total pore volume of 0.1–0.3 cc/g and a four-point bending strength of 2-20 kg/mm². The calcined ceramics is worked wet by machines to a desired shape, and afterwards the shaped ceramic material is sintered to manufacture a ceramic product.

3 Claims, 3 Drawing Sheets

METHOD FOR MANUFACTURING CERAMIC PRODUCTS

BACKGROUND OF THE INVENTION AND DESCRIPTION OF RELATED ART

The present invention relates to a method for manufacturing low cost ceramic parts and products with both improved machining efficiency and excellent reliability, and in particular, relates to a method that may be suitably used for the manufacture of complicatedly-shaped ceramic parts and products produced on a small volume, multiple production basis.

Ceramic materials such as silicon nitride, silicon carbide, partially stabilized zirconia and the like have excellent properties such as high resistance to heat, high resistance to abrasion, high hardness, and high resistance to corrosion, and have been advantageously used as parts of engines and other machine elements. In recent years, fields of the application of these ceramic materials have spread through successive improvements and rationalized designs.

Ceramic materials generally undergo contraction by ten and several percent when sintered, and must be machined or worked after sintered when they are used for such automobile engines and gas turbines that require dimensional accuracy.

Sintered ceramics are so hard that diamonds are used to work them by cutting. However, since ceramics are also such brittle materials that chipping and cracks are likely to form on their surface. Especially, cracks are found to form on the surface because of the heat shock due to the heat generated during such machine processing. Although various machining or working methods have been proposed, many of their practices are kept as proprietary in the form of "know-how" of private companies or organizations.

On the other hand, ceramic parts and products with complicated shapes such as turbo-charger rotors and turbine rotors are difficult to work and injection moulding is advantageously used and according to this method substantially finished shapes are obtained and machining or working before and after sintering is minimized.

Furthermore, Japanese Patent Laid-Open (Kokai) No. 59-96912 discloses a method for manufacturing ceramic products, wherein press-moulded materials are first calcined, machine-worked to the desired shape with a cutting tool having grinding particles adhered to it, then sintered, and afterwards machine-worked for the final shape.

Alternatively, rods of $Al_2O_3$ and $Si_3N_4$ are first produced by extrusion followed by calcining at various temperatures. Then, the resultant materials are worked dry by ultra-hard alloy ceramic bites, or worked wet by diamond bites. Reports on this method, in particular, about workability and abrasion of bites have been abundant.

The method of injection moulding has less working processes and may be suitably applied to moulding of turbocharger rotors and turbine rotors, but the cost of metal moulds is so expensive that this method may not be suitable for the manufacture of ceramic products of "small volume, multiple production".

In a dry method in which materials shaped by pressing or extrusion, or materials that have been removed of binders by heating are machine-worked dry, the bonding between particles of the moulded materials is so weak that they are susceptible to breakage. In addition, such particles are likely to be peeled off the worked surface, resulting in roughened surfaces and sometimes producing defective products with cracks. If grinding is used, small ground particles are loaded on the surface of the grinder and dressing must often be used, and working efficiency is substantially reduced. Furthermore, when it undergoes wet working, the moulded product tends to collapse while dry working is less efficient because of reduced cooling rates.

Further, Japanese Patent Laid-Open (Kokai) No. 59-96912 describes a method of calcining shaped materials at calcining temperatures ranging from 1000° to 1500° C. for 30 to 300 minutes to obtain hardness suitable to dry machining or working in which suitable temperatures for silicon nitride are in the range of 1470° to 1490° C. However, confirmation tests revealed that the hardness thus obtained was too high to attain satisfactory workability.

In addition, according to a method in which moulded $Si_3N_4$ is calcined at a temperature of 1,000° C. or above followed by cutting wet or dry, it has been reported that machineability is excellent when the moulded $Si_3N_4$ is calcined at 1400° C. while good surface roughness is obtained at calcining temperatures of 1300° C. or lower. However, no suitable calcining conditions have been known for ceramic products such as turbo-charger rotors with complicated shapes which should be formed by machining followed by sintering.

The present invention is, therefore, to provide a method to solve the problem described above and is suitably used for the manufacture of low cost ceramic products with both improved machining efficiency and excellent reliability, and in particular, for manufacturing ceramic products that may be useful for a complicatedly-shaped ceramic product which are usually produced on a small volume, multiple production basis.

SUMMARY OF THE INVENTION

According to the present invention, there is provided a method for manufacturing ceramic products, which comprises the steps of:

applying hydrostatic pressure to a formed or moulded ceramic material before calcination, calcining the hydrostatic-pressure-applied formed ceramic material in such a temperature that contraction after calcination is less than one percent, obtaining calcined ceramics having an average pore size of 0.04–0.3 $\mu$m and a total pore volume of 0.1–0.3 cc/g and a four-point bending strength of 2–20 kg/mm$^2$, working wet by machines to a desired shape, and sintering the shaped ceramic material to manufacture a ceramic product.

DETAILED DESCRIPTION OF THE INVENTION

Figure 1:
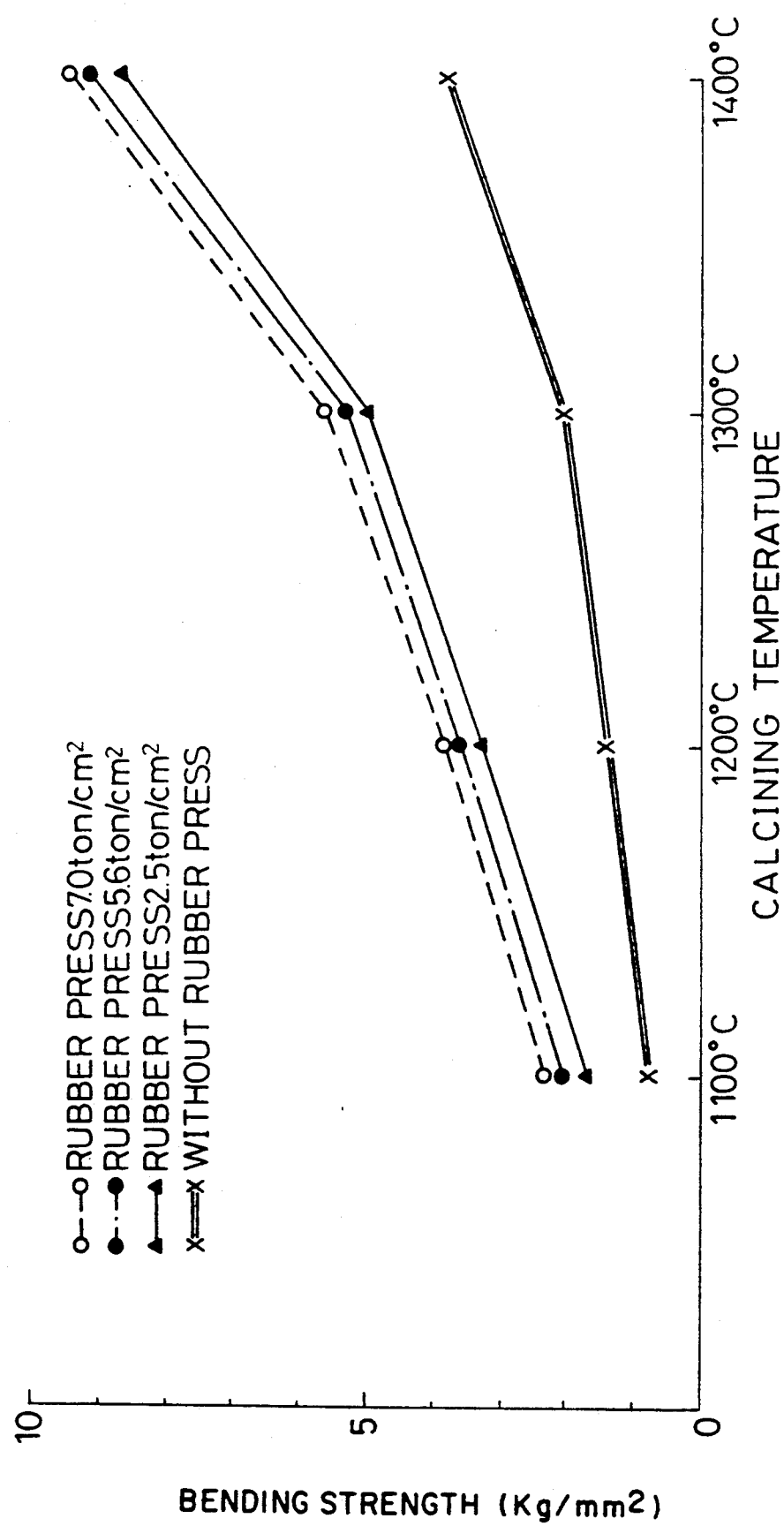
FIG. 1 is a graph showing the relation of measured strengthes of those calcined ceramics which had been variously treated with the rubber press method and calcining temperatures ranging 1100°–1400° C.

The present invention will be described in detail hereinafter.

In accordance with the present invention, a method is provided which is characterized in that formed or moulded ceramic materials are calcined in such a manner that they have specific properties, and then worked wet. That is, formed or moulded ceramic materials are so calcined as to obtain an average pore size of 0.04–0.3 $\mu$m, preferably 0.04–0.2 $\mu$m and a total pore volume of 0.1–0.3 cc/g, preferably 0.2–0.3 cc/g and a four-point bending strength of 2–20 kg/mm$^2$, preferably 3–5 kg/mm$^2$ as measured with a test piece cut form calcined ceramic materials according to JIS R 1601, and afterwards the calcined ceramic materials are worked wet with machines.

Working wet by machines as used herein means grinding ceramics with grinders under conditions that a cooling medium selected from grinding oil, water and the like is supplied to the area of grinding. Any abrasive grinders such as GC, WA and diamonds can be suitably utilized for this purpose. In particular, when large amounts of materials are ground, porous #140 GC abrasive grinders have twice as high machinability as normal #140 GC abrasive grinders since any chips and swarf are absorbed on the GC grinders. Grinding can be conducted using grinding machines including milling machines, surface grinders, internal grinders, cylindrical grinders and machining centers.

When the average pore size and total pore volume described above were measured, a mercury-type porosimeter was used.

In the case that the average pore size of calcined ceramic materials is less than 0.04 $\mu$m, the bonding strength of ceramic particles, of which the calcined ceramic materials are composed, is so weak that cavities sometimes form on the surface currently being machined because of losing particles from the surface. In addition, it is disadvantageously difficult to support calcined ceramic materials properly since their strength is not enough.

On the other hand, in the case that the average pore size of calcined ceramic materials is more than 0.3 $\mu$m impurities such as chips and swarf or iron rust contained in the water coolant tend to enter the pore and, after sintered, cause defective products.

When the total pore volume of calcined ceramic materials is less than 0.1 cc/g, the calcined ceramic materials are so densely sintered that their high strength tends to lower grinding ratios.

On the other hand, when the total pore volume of calcined ceramic materials is more than 0.3 cc/g, the strength of calcined ceramic materials is so small that cracks often form when they are supported by chucks.

In the case that the four-point bending strength of calcined ceramic material is less than 2 kg/mm$^2$, disadvantageous problems are likely to occur including damage while machined and cracks while handled.

On the other hand, in the case that the four-point bending strength of calcined ceramic material is more than 20 kg/mm$^2$, grinding ratios decrease, resulting in less efficient machining.

According to the present invention, calcined ceramic materials with proper strength and of porous nature are obtained so that they allow the coolant to enter as deep as the point of grinding for sufficient cooling of the edge of a grinding tool. Accordingly, overheat or seizure of grinding particles such as diamonds does not occur and the edge consisting of diamond grains is maintained to be sound and unglazed for a long time. Therefore, grinding ratios increase by a factor of 5–30 compared with wet machining of sintered materials. Furthermore, when the rate of grinding or removal is increased to work under heavy load, grinding efficiency is much higher compared with wet machining of sintered materials since the calcined ceramic materials are porous enough to permit sufficient cooling. In addition, because of their porous nature, cracks, if any, tend to be trapped by voids and no large cracks hardly form over the calcined ceramic materials.

Further, no foreign materials will be contained in the sintered ceramics even when the coolant for grinding area is dirty as often encountered in recycling used cooling water. This is based on a theory that the diameter of a pore is smaller than that of a foreign material so that the foreign material is filtered away on the surface of the calcined body and cannot penetrate deep into the body.

Therefore, it is highly important that any ceramic material should be calcined under the conditions that, upon calcination, it has an average pore size of 0.04–0.3 $\mu$m, a total pore volume of 0.1–0.3 cc/g, and a four-point bending strength of 2–20 kg/mm$^2$.

In order to obtain a calcined ceramic material with such superior machinable properties, it is imperative to provide pore and strength characteristics as described above without promoting glassification of a sintering coagent. According to the present invention, hydrostatic pressure is applied to the ceramic material before calcination for this purpose. Hydrostatic pressure thus applied brings a uniform shaped body with less variations of shrinkage upon sintering so that depth of grinding after sintering becomes smaller and that bonding forces between particles are strong enough to calcine at a temperature that will not promote glassification of a sintering coagent. The hydrostatic pressure is preferably more than 2.0 ton/cm$^2$, and preferably in the range of 2.0–6.0 ton/cm$^2$ for the reason that a bending strength of more than 2 kg/mm$^2$ required for machining must be obtained with a shrinkage of less than one percent, preferably less than 0.5 percent, after calcination without any substantial glassification of a sintering coagent.

In general, the calcining temperature is selected so that, for example, silicon nitride sintered under atmospheric pressure is calcined at a temperature of 800° to 1450° C., preferably 1100° to 1300° C. and more preferably 1150° to 1250° C. under the atmosphere of nitrogen gas or any other inert gas. In the case that silicon carbide is used, the calcining temperature should be in the range of 1500° to 1700° C. under the atmosphere of any inert gas. For partially-stabilized zirconia, the calcining temperature should be in the range of 850° to 1200° C., preferably 950° to 1050° C. under the atmosphere of air.

Too low calcining temperature is disadvantageous because of pinholes or chipping appearing on the calcined material due to the effect of liquid pressure of grinding fluids.

Alternatively, much of organic binders such as poly vinyl alcohol, methylcellose and the like may be compounded into the ceramic material at the stage of shaping in order to realize those pore and strength properties on the calcined ceramic material.

Preferably, ceramic materials according to the present invention are selected from the group called "diffcult-to-grind" ceramics which consists of silicon nitride, silicon carbide and partially-stabilized zirconia. These ceramic materials possess very high strength upon sintering and are suitable in particular to the present invention. Since the shrinkage of calcined ceramic materials is so small, only less than one percent, preferably less than 0.5 percent cent, that it is possible to determine the degree of shrinkage obtainable after sintering. Accordingly, the calcined ceramic materials should be machined in consideration of their degree of shinkage for obtaining the final sintered product with excellent dimensional accuracy. In addition, according to the present invention, any harmful defects are unlikely to appear on sintered surfaces so that it is possible to obtain high-grade surfaces for the final product. Therefore, only small portions of the surface, as needed, are required to be machined wet and this greatly reduces the cost of machining such ceramic materials.

As described above, according to the present invention, the ceramic material is first calcined, machined wet to a desired shape and then sintered for the final product.

The sintering conditions are determined properly depending on kinds of ceramics and purposes of use of said ceramics. For example, when sintered silicon nitride is used, it is preferable that the sintering temperature is in the range of 1600° to 1800° C. and they are sintered under the atmosphere of nitrogen gas.

When sintered partially-stabilized zirconia is used, it is preferable that the sintering temperature is in the range of 1300° to 1500° C. and they are sintered under the atmosphere of air.

As to the method for shaping ceramic materials, any conventional methods such as extrusion, pressing and slip casting are conveniently used.

The following examples are presented for further illustration of the present invention and are not to be considered as unduly limiting the scope of this invention.

EXAMPLE 1 AND COMPARATIVE EXAMPLES 90 parts by weight of silicon nitride powder with an average particle size of 1.0 μm were admixtured with 6 parts by weight of magnesium oxide powder, 4 parts by weight of cerium oxide powder, and 2 parts by weight of strontium carbonate powder as sintering coagents to form 100 parts by weight of a ceramic material powder. To the resultant material powder were added 1 part by weight of poly vinyl alcohol solids and 40 parts by weight of water as shaping coagents to prepare a slurry, which was then sprayed dry to form granules. The resultant granules were charged to a metal mould, and pressurized uniaxially under a pressure of 200 kg/cm$^2$ to form samples of 60×60×15$^t$ mm. Then, after a pressure of 2.5 ton/cm$^2$ had been applied to these samples according to the rubber press method, the samples were heated to 500° C. in air in order to strip off the binder used, and then calcined at temperatures of 950° C., 1150° C., 1250° C., and 1400° C. under the atmosphere of nitrogen gas to form several calcined ceramic materials. The pore and strength-related properties of these calcined ceramic materials are provided in Table 1.

Then, a surface grinder was used for grinding the samples with a resino-diamond grinder having a grain size of #140 to obtain grinding ratios. This wet-type, traverse grinding was operated under the conditions of a grinding rate of 30 μm/stroke, a cross feed rate of 1.5 mm/stroke, and a sample feed rate of 20 mm/min.

On the other hand, without calcination, the aforementioned samples were sintered in N$_2$ atmosphere at a temperature of 1650° C. for one hour to obtain compact, sintered materials having a density of 3.2 g/cm$^3$. These material were then worked according to the aforementioned method to measure grinding ratios, which were then compared with those ratios obtained for the above calcined ceramic materials. Furthermore, the ceramic material calcined at a temperature of 950° C. was machined dry to investigate its machinability.

As a result, it was found that the calcined ceramic materials that had been worked wet according to the present invention were 10 to 20 times superior in grinding ratios compared with the material that had been only sintered and then shaped by grinding. Working by dry conditions was impossible because of excessive loading of chips and swarf on the surface of the grinder. Samples of those ceramic materials that underwent calcination followed by grinding wet were then sintered in N$_2$ atmosphere at a temperature of 1650° C. for one hour to obtain compact, sintered materials having a density of 3.2 g/cm$^3$. Visual examination of the appearance of the sample did not reveal any harmful defects such as inclusion of foreign materials and cracks. Therefore, it was concluded that the sample was a sound and perfect sintered product.

Next, 96 parts by weight of silicon carbide powder with an average particle size of 0.7 μm were admixtured with 3 parts by weight of amorphous carbon powder and 1 part by weight of boron carbide powder as sintering coagents to form 100 parts by weight of a ceramic material powder. To the resultant material powder were added 1 part by weight of poly vinyl alcohol solids and 35 parts by weight of water as shaping coagents to prepare a slurry, which was then sprayed dry to form granules. The resultant granules were charged to a metal mould, and pressurized uniaxially under a pressure of 200 kg/cm$^2$ to form samples of 60×60×15$^t$ mm. Then, after a pressure of 2.5 ton/cm$^2$ had been applied to these samples according to the rubber press method, the samples were heated to 300° C. in Ar gas atmosphere in order to strip off the binder, and then calcined in the Ar gas atmosphere at temperatures of 1500° C., 1600° C., and 1700° C. to form several calcined ceramic materials. The pore and strength-related properties of these calcined ceramic materials are shown in Table 1.

Then, the calcined ceramic materials described above were subjected to the aforementioned wet-type, traverse grinding to obtain grinding ratios.

On the other hand, without calcination, the aforementioned samples were sintered in Ar gas atmosphere at a temperature of 2100° C. for one hour to obtain compact, sintered materials having a density of 3.1 g/cm$^3$. These material were then used for measuring grinding ratios according to a similar method as described above, The data thus obtained were then compared with those ratios obtained for the calcined ceramic materials as prepared above.

As a result, it was found that the calcined ceramic materials that had been worked wet according to the present invention were 15 to 24 times superior in grinding ratios compared with those materials that had been only sintered and shaped by grinding. Samples of those ceramic materials that underwent calcination followed by grinding wet were then sintered in Ar gas atmosphere at a temperature of 2100° C. for one hour to obtain compact, sintered materials having a density of 3.1 g/cm³. Visual examination of the appearance of the sample did not reveal any harmful defects such as inclusion of foreign materials and cracks. Therefore, it was concluded that the sample was a sound and perfect sintered product.

Next, 96.5 mole % of zirconia powder with an average particle size of 0.5 μm were admixtured with 3.5 mole % of yttrium oxide powder as a sintering coagent to form 100 parts by weight of a ceramic material powder. To the resultant material powder were added 1 part by weight of poly vinyl alcohol solids and 40 parts by weight of water as shaping coagents to prepare a slurry, which was then sprayed dry to form granules.

The resultant granules were charged to a metal mould, and pressurized uniaxially under a pressure of 200 kg/cm² to form samples of 60×60×15' mm. Then, after a pressure of 2.5 ton/cm² had been applied to these samples according to the rubber press method, the samples were calcined in air at temperatures of 850° C., 950° C., and 1050° C. to form several calcined ceramic materials.

The pore and strength-related properties of these calcined ceramic materials are given in Table 1.

Then, the calcined ceramic materials described above were subjected to the aforementioned wet-type, traverse grinding to obtain grinding ratios.

On the other hand, without calcination, the aforementioned samples were sintered in air at a temperature of 1,430° C. for two hours to obtain compact, sintered materials having a density of 5.9 g/cm³. These materials were then used for measuring grinding ratios according to a similar method as described above. The data thus obtained were then compared with those ratios obtained for the calcined ceramic material as prepared above.

As a result, it was found that the calcined ceramic materials that had been ground wet according to the present invention were 8 to 11 times superior in grinding ratios to those materials that had been only sintered and shaped by grinding. Samples of those ceramic materials that underwent calcination followed by grinding wet was then sintered in air at a temperature of 1430° C. for two hours to obtain a compact, sintered material having a density of 5.9 g/cm³. Visual examination of the appearance of the sample did not reveal any harmful defects such as inclusion of foreign materials and cracks. Therefore, it was concluded that the sample was a sound and perfect sintered product.

TABLE 1

| Run No. | Example 1 | | | | | | |
|---|---|---|---|---|---|---|---|
| | 1 | 2 | 3 | 4 | 5 | 6 | 7 |
| Materials | Silicon Nitride | Silicon Nitride | Silicon Nitride | Silicon Nitride | Silicon Carbide | Silicon Carbide | Silicon Carbide |
| Calcining Temp. (°C.) | 950 | 1150 | 1250 | 1400 | 1500 | 1600 | 1700 |
| Sintering Temp. (°C.) | | | | | | | |
| Properties of Calcined Ceramic Materials | | | | | | | |
| Pore characteristics | | | | | | | |
| Av. Pore Size (μm) | 0.06 | 0.08 | 0.09 | 0.25 | 0.05 | 0.06 | 0.07 |
| Total Pore volume (cc/g) | 0.23 | 0.23 | 0.23 | 0.15 | 0.25 | 0.25 | 0.24 |
| Four-point-Bending Strength (kg/mm²) | 3.5 | 5.0 | 10.0 | 16.5 | 2.1 | 3.0 | 6.0 |
| Type of Machining | Wet-type Grinding | Wet-type Grinding | Wet-type Grinding | Wet-type Grinding | Wet-type Grinding | Wet-type Grinding | Wet-type Grinding |
| Machining Characteristics of Calcined Ceramic Materials | | | | | | | |
| Grinding Ratio | 6300 | 4800 | 3800 | 2500 | 7100 | 5200 | 4500 |
| Grindability | Highly efficient machining is possible | Highly efficient machining is possible | Highly efficient machining is possible | Highly efficient machining is possible | Highly efficient machining is possible | Highly efficient machining is possible | Highly efficient machining is possible |

| Run No. | Example 1 | | | Comparative Examples | | | |
|---|---|---|---|---|---|---|---|
| | 8 | 9 | 10 | 1 | 2 | 3 | 4 |
| Materials | Partially Stabilized Zirconia | Partially Stabilized Zirconia | Partially Stabilized Zirconia | Silicon Nitride | Silicon Nitride | Silicon Carbide | Partially Stabilized Zirconia |
| Calcining Temp. (°C.) | 850 | 950 | 1050 | | 950 | | |
| Sintering Temp. (°C.) | | | | 1650 | | 2100 | 1430 |
| Properties of Calcined Ceramic Materials | | | | | | | |
| Pore characteristics | | | | | | | |
| Av. Pore Size (μm) | 0.04 | 0.05 | 0.06 | | 0.06 | | |
| Total Pore volume (cc/g) | 0.26 | 0.26 | 0.22 | | 0.23 | | |
| Four-point-Bending Strength (kg/mm²) | 2.0 | 3.5 | 5.0 | (90.0) | 3.5 | (40) | (105) |
| Type of Machining | Wet-type Grinding | Wet-type Grinding | Wet-type Grinding | Wet-type Grinding | Dry-type Grinding | Wet-type Grinding | Wet-type Grinding |
| Machining Characteristics of Calcined Ceramic Materials | | | | | | | |
| Grinding Ratio | 9500 | 8000 | 7100 | 250 | — | 300 | 870 |
| Grindability | Highly efficient machining is possible | Highly efficient machining is possible | Highly efficient machining is possible | Highly efficient machining is im-possible | Machining is im-possible because of loading on | Highly efficient machining is im-possible | Highly efficient machining is im-possible |

TABLE 1-continued grinders ( ) designates properties of sintered products.

EXAMPLE 2

90 parts by weight of silicon nitride powder having an average particle size of 1.2 μm were admixtured with 5 parts by weight of magnesium oxide powder, 7 parts by weight of yttrium oxide powder and 0.5 parts by weight of zirconium oxide as sintering coagents to form 100 parts by weight of a ceramic material powder. To the resultant material powder were added 1 part by weight of polyvinyl alcohol solids and 40 parts by weight of water as shaping coagents to prepare a slurry, which was then sprayed dry to form granules.

The resultant granules were charged to a metal mould, and pressurized uniaxially under a pressure of 0.5 ton/cm² to form samples of 60×60×7' mm. Then, after pressures of 2.5 ton/cm², 5.6 ton/cm² and 7.0 ton/cm² had been applied to each of these samples according to the rubber press method, all the samples were heated to 500° C. in air in order to strip off the binder, and further calcined in $N_2$ atmosphere at temperatures of 1100° C., 1200° C., 1300° C., and 1400° C. to form several calcined ceramic materials.

FIG. 1 shows measured strengthes of those ceramic materials treated with the rubber press method and then calcined in the range of 1100° to 1400° C.

Then, a drilling machine was used for cutting wet the calcined ceramic materials using #170 diamond core drills with a rate of tool rotation of 2000 rpm, a traverse speed of 1.2 mm/min. The depth of cut was 4 mm.

Figure 2:
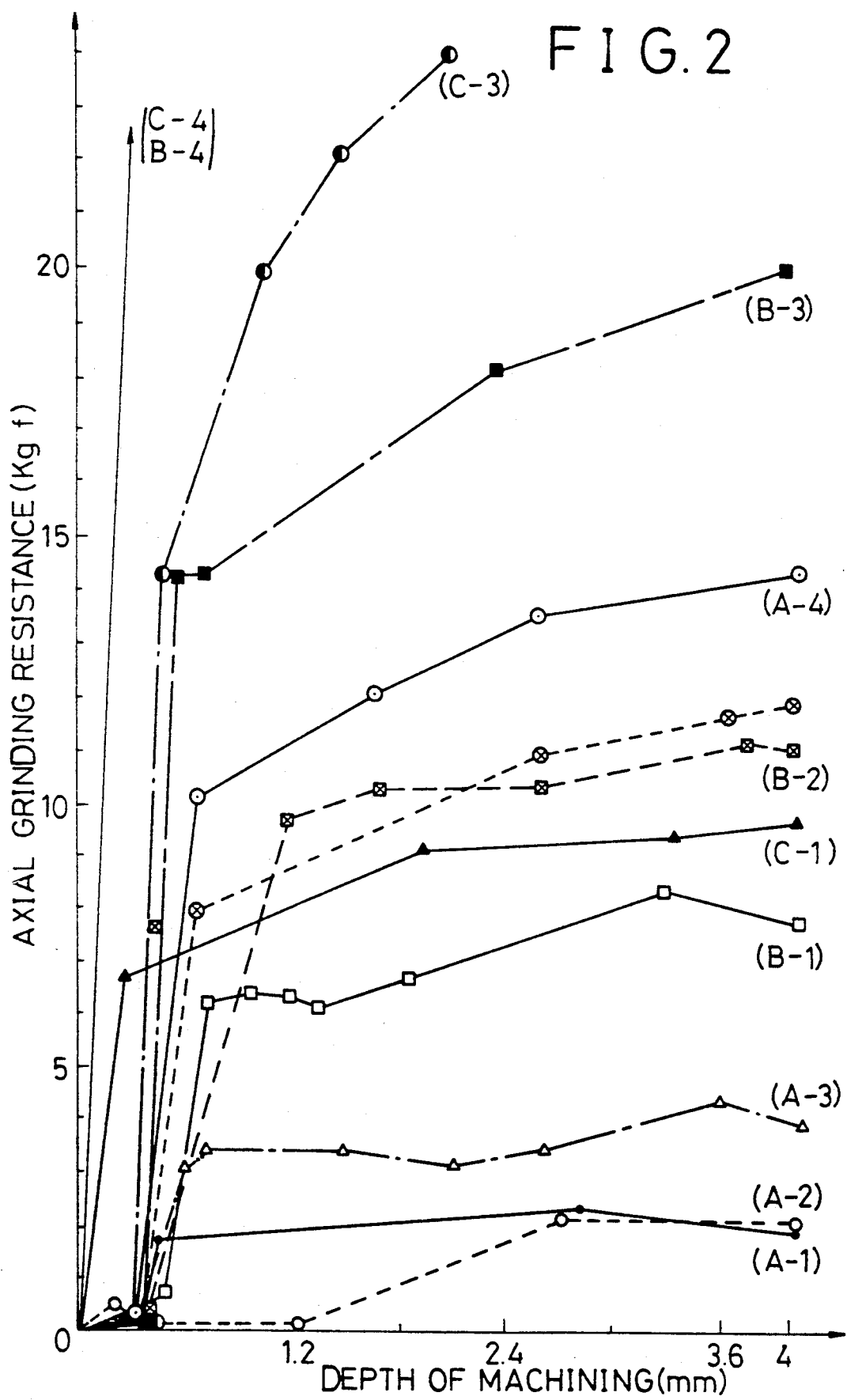
FIG. 2 is a graph showing the relation of measured axitial grinding resistances and depthes of machining.

FIG. 2 shows measured axitial grinding resistances and depth of cut. Referring to FIG. 2, line A-1 shows a ceramic material which had not been treated with the rubber press method and then calcined at 1100° C., line A-2 shows a ceramic material which had not been treated with the rubber press method and then calcined at 1200° C., line A-3 shows a ceramic material which had not been treated with the rubber press method and then calcined at 1300° C., and line A-4 shows a ceramic material which had not been treated with the rubber press method and then calcined at 1400° C. Line B-1 shows a ceramic material treated with the rubber press method at 5.6 ton/cm² and then calcined at 1100° C., line B-2 shows a ceramic material treated with the rubber press method at 5.6 ton/cm² and then calcined at 1200° C., line B-3 shows a ceramic material treated with the rubber press method at 5.6 ton/cm² and then calcined at 1300° C., and line B-4 shows a ceramic material treated with the rubber press method at 5.6 ton/cm² and then calcined at 1400° C. Line C-1 shows a ceramic material treated with the rubber press method at 7.0 ton/cm² and then calcined at 1100° C., line C-2 shows a ceramic material treated with the rubber press method at 7.0 ton/cm² and then calcined at 1200° C., line C-3 shows a ceramic material treated with the rubber press method at 7.0 ton/cm² and then calcined at 1300° C., and line C-4 shows a ceramic material treated with the rubber press method at 7.0 ton/cm² and then calcined at 1400° C.

It can be seen in FIGS. 1 and 2 that grinding resistances of the ceramic materials that had not been treated with the rubber press method and calcined at any temperatures of 1100° to 1400° C. were small. On the other hand, it was disadvantageous that the strength of each calcined ceramic material was so low that fracture often occurred when it was ground. When the ceramic materials had been treated with the rubber press method at 2.5 ton/cm² to 7.0 ton/cm², there was no serious problem about bonding strength so that no fracture occurred at the stage of grinding. However, in the case that pressures of 5.6 ton/cm² or higher were applied to the material according to the rubber press method and then calcined at 1,300° C. or above, the grinding resistance was so great that wear of a abrasive material may be high, thus resulting in poor economics.

Table 2 shows the relation of rubber press pressures to fraction of shrinkage after calcining and after sintering.

As can be clearly seen from Table 2, the ratio of shrinkage after calcining for materials which had not been treated with rubber press is significantly small. This is because particles are bonded to each other rather weakly and accordingly it can be understood that mechanical strength of the calcined material is also low. This is true for the sintered material that also shows smaller fraction of shrinkage and low mechanical strength. In addition, since the pressure was applied uniaxially, difference in densities could not be avoided because of non-uniformity of pressure distribution and shrinkage was also not uniform. Thus, it is necessary to allow work margin enough to compensate this non-uniformity, which in turn lengthens the time of work considerably.

Furthermore, it can be seen from Table 2 that the fraction of shrinkage after calcining for materials treated with rubber press is less than 0.5% at calcining temperatures of 1300° C. or lower, showing negligible contraction while the shrinkage fraction increases to above 1.0% at a calcining temperature of 1400° C. This is because glassification of sintering coagents starts to proceed rapidly when temperatures go beyond 1400° C. It is thus easily understood that the mechanical strength of calcined ceramic materials increases rapidly and accordingly the machinability decreases.

TABLE 2

| Rubber Press Pressure (ton/cm²) | Calcining Temp. (°C.) | Fraction of Shrinkage | | |
|---|---|---|---|---|
| | | After Rubber Press | After Calcining | After Sintering |
| None | 1100 | — | 0.994 | 0.765 |
| | 1200 | — | 0.993 | 0.766 |
| | 1300 | — | 0.988 | 0.764 |
| | 1400 | — | 0.967 | 0.765 |
| 2.5 | 1100 | 0.934 | 0.933 | 0.755 |
| | 1200 | 0.934 | 0.931 | 0.756 |
| | 1300 | 0.934 | 0.929 | 0.755 |
| | 1400 | 0.934 | 0.902 | 0.754 |
| 5.6 | 1100 | 0.913 | 0.912 | 0.756 |
| | 1200 | 0.913 | 0.906 | 0.756 |
| | 1300 | 0.913 | 0.909 | 0.755 |
| | 1400 | 0.913 | 0.899 | 0.755 |
| 7.0 | 1100 | 0.906 | 0.906 | 0.755 |
| | 1200 | 0.906 | 0.905 | 0.756 |
| | 1300 | 0.906 | 0.904 | 0.754 |
| | 1400 | 0.906 | 0.896 | 0.755 |

EXAMPLE 3

The ceramic material powder utilized in Example 1 was used to prepare granules, which were then charged to a cylindrical rubber mould having an inner diameter of 150 mm, a length of 200 mm and a thickness of 2.0 mm. Then, after a pressure of 5.0 ton/cm² had been applied according to the rubber press method, the resulting moulded material was then heated to 500° C. in the air in order to strip off the binder, and further calcined under $N_2$ atmosphere at a temperature of 1,250° C. to obtain a calcined ceramic material (100 mm in outer diameter and 130 mm in height) having the same properties as Run No. 3 shown in Table 1.

Figure 3:
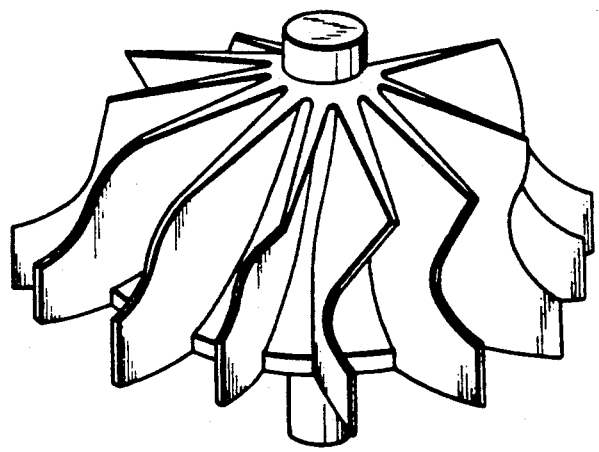
FIG. 3 is a perspective illustration of an example of a ceramic turbo-charger rotor with complicated shape.

The calcined ceramic material mentioned above was set in a four-axis NC machining center and ground wet using a #60 GC ball-end-mill for six hours to obtain a ceramic turbo-charger rotor having complicatedly shaped wing fins as shown in FIG. 3. Then, this rotor was sintered under $N_2$ atmosphere at a temperature of 1650° C. for one hour to obtain a compact, sintered ceramic turbo-charger rotor having a density of 3.2 g/cm³. Visual examination of the appearance of the ceramic turbo-charger rotor thus produced did not reveal any harmful defects such as inclusion of foreign materials and cracks. In addition, the shrinkage of the sintered material due to sintering was only 16% and homogenous in every part, indicating this product being a ceramic turbo-charger rotor with exceptionally good dimensional accuracy.

What is claimed is:

1. A method for manufacturing ceramic products having complicated shapes, which comprises the steps of:
    applying a hydrostatic pressure of 2.0 ton/cm² or higher to a complicated shaped silicon nitride prior to calcination,
    calcining said hydrostatic-pressure-applied complicated shaped silicon nitride at a temperature of about 1100° to 1300° C. to limit the shrinkage of the complicated shaped silicon nitride after calcining to less than one percent and form a calcined complicated shaped ceramic having an average pore size of 0.04–0.3 μm and a total pore volume of 0.1–0.3 cc/g and a four-point bending strength of 2–20 kg/mm²,
    wet grinding the calcined complicated shaped ceramic to a desired shape, and
    sintering the calcined complicated shaped ceramic to manufacture a ceramic product.

2. A method for manufacturing ceramic products having complicated shapes, which comprises the steps of:
    applying a hydrostatic pressure of 2.0 ton/cm² or higher to a complicated shaped silicon carbide prior to calcination,
    calcining said hydrostatic-pressure-applied complicated shaped silicon carbide at a temperature of about 1500° to 1700° C. to limit the shrinkage of the complicated shaped silicon carbide after calcining to less than one percent and form a calcined complicated shaped ceramic having an average pore size of 0.04–0.3 μm and a total pore volume of 0.1–0.3 cc/g and a four-point bending strength of 2–20 kg/mm²,
    wet grinding the calcined complicated shaped ceramic to a desired shape, and
    sintering the calcined complicated shaped ceramic to manufacture a ceramic product.

3. A method for manufacturing ceramic products having complicated shapes, which comprises the steps of:
    applying a hydrostatic pressure of 2.0 ton/cm² or higher to a complicated shaped partially stabilized zirconia prior to calcination,
    calcining said hydrostatic-pressure-applied complicated shaped partially stabilized zirconia at a temperature of about 950° to 1050° C. to limit the shrinkage of the complicated shaped partially stabilized zirconia after calcining to less than one percent and form a calcined complicated shaped ceramic having an average pore size of 0.04–0.3 μm and a total pore volume of 0.1–0.3 cc/g and a four-point bending strength of 2–20 kg/mm²,
    wet grinding the calcined complicated shaped ceramic to a desired shape, and
    sintering the calcined complicated shaped ceramic to manufacture a ceramic product.

* * * * *